(12) United States Patent  (10) Patent No.: US 7,769,287 B2
Sakamoto  (45) Date of Patent: Aug. 3, 2010

(54) IMAGE TAKING APPARATUS AND IMAGE TAKING METHOD

(75) Inventor: Shoichiro Sakamoto, Asaka (JP)

(73) Assignee: Fujifilm Corporation, Tokyo (JP)

( * ) Notice: Subject to any disclaimer, the term of this patent is extended or adjusted under 35 U.S.C. 154(b) by 226 days.

(21) Appl. No.: 12/010,301

(22) Filed: Jan. 23, 2008

(65) Prior Publication Data

US 2008/0205866 A1 Aug. 28, 2008

(30) Foreign Application Priority Data

Jan. 24, 2007 (JP) ............................... 2007-014264

(51) Int. Cl.
*G03B 3/00* (2006.01)
*G03B 13/00* (2006.01)
*G03B 17/00* (2006.01)
*H04N 7/18* (2006.01)
*H04N 5/232* (2006.01)
*G06K 9/00* (2006.01)
*A61B 3/14* (2006.01)

(52) U.S. Cl. .................. 396/125; 396/263; 348/78; 348/348; 382/118; 351/210

(58) Field of Classification Search ................. 396/263, 396/125
See application file for complete search history.

(56) References Cited

U.S. PATENT DOCUMENTS 5,428,413 A * 6/1995 Shindo ....................... 351/210
5,548,354 A * 8/1996 Kasahara et al. ............. 351/206
6,606,111 B1 * 8/2003 Kondo et al. .............. 348/14.01
2004/0197013 A1 10/2004 Kamei ........................ 382/118
2007/0247524 A1 * 10/2007 Yoshinaga et al. ............ 348/78

FOREIGN PATENT DOCUMENTS

| EP | 1 460 580 A1 | 9/2004 |
| JP | 2003-187229 A | 7/2003 |
| JP | 2003-224761 A | 8/2003 |
| WO | WO-03/052690 A1 | 6/2003 |

OTHER PUBLICATIONS

"Science Direct-Pattern Recognition Letters: Eye detection by using fuzzy template matching and feature-parameter-based judgement", Ying Li, Xiang-lin Qi and Yun-jiu Wang, vol. 22, Issue 2001, Aug. 2001, 9 pages.*

* cited by examiner

*Primary Examiner*—Melissa J Koval
(74) *Attorney, Agent, or Firm*—Birch, Stewart, Kolasch & Birch, LLP

(57) ABSTRACT

An aspect of the present invention provides an image taking apparatus comprising an imaging device which takes an image of a subject, an imaging instruction device for inputting an imaging instruction to take the image of the subject, a face detection device which detects a face image of the subject from a live view image taken by the imaging device in response to the imaging instruction from the imaging instruction device, an eye direction judgment device which detects an eye direction of the subject from the face image and judges whether the eye direction of the subject is directed to the imaging device, and an imaging control device which, when it is judged that the eye direction of the subject is directed to the imaging device, immediately causes the imaging device to take an image of the subject.

10 Claims, 15 Drawing Sheets

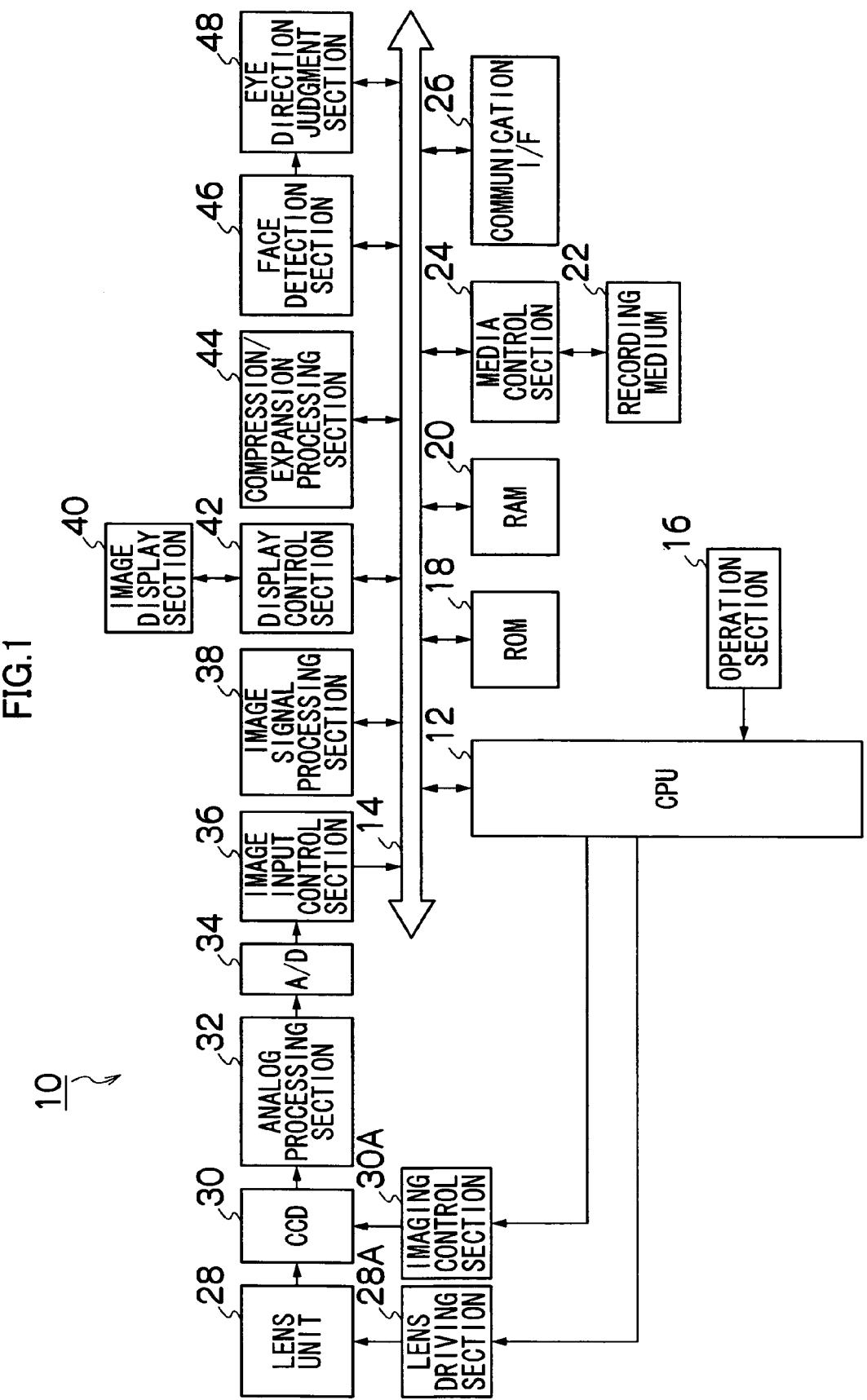

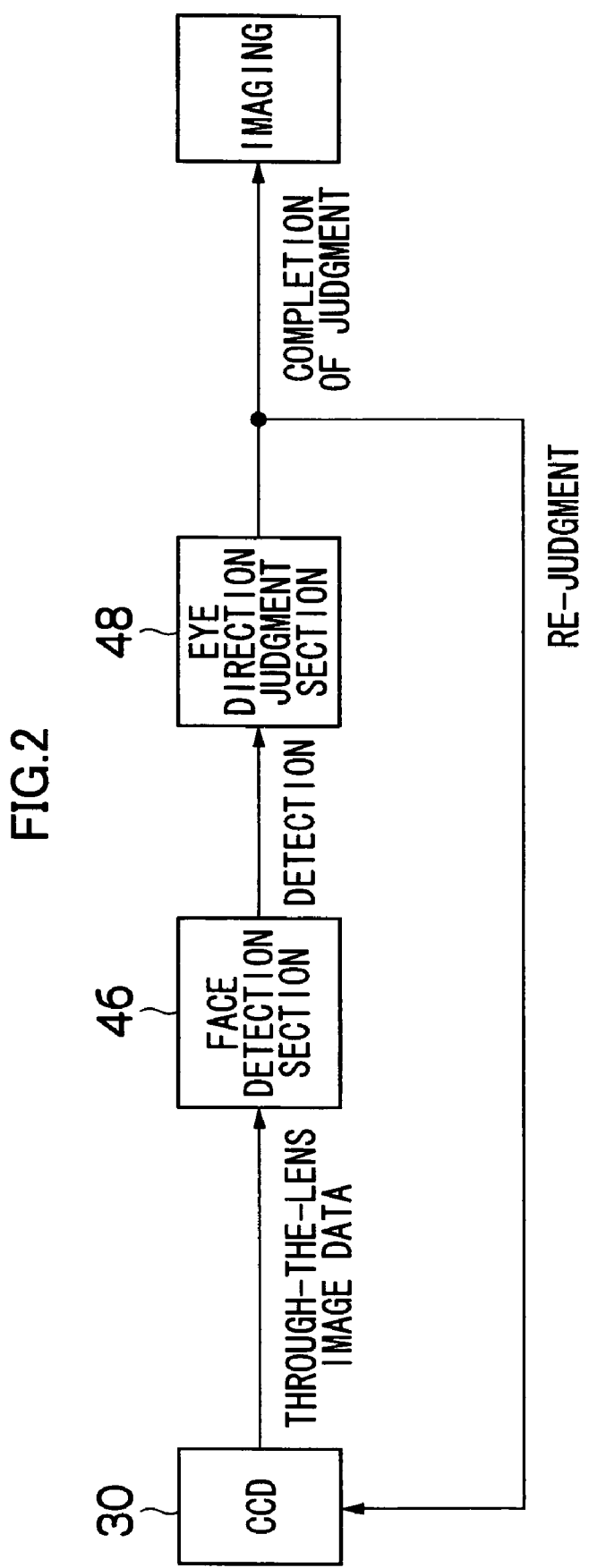

(LEFT)

(FRONT)

(RIGHT)

FIG.4C 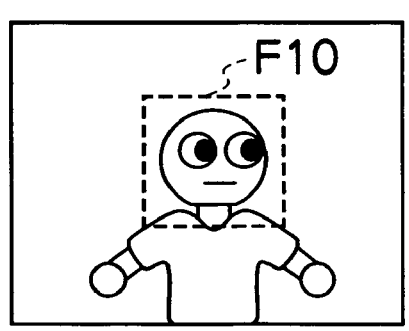 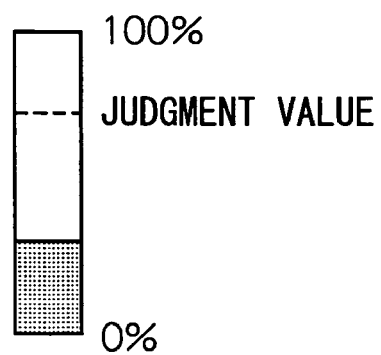
FIG.4D 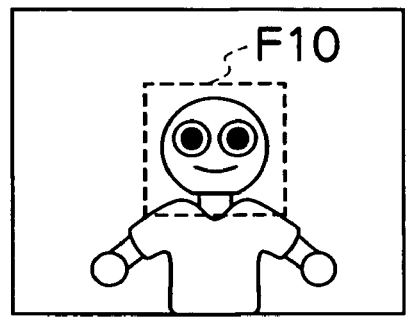 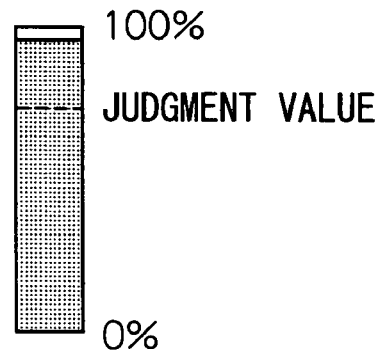

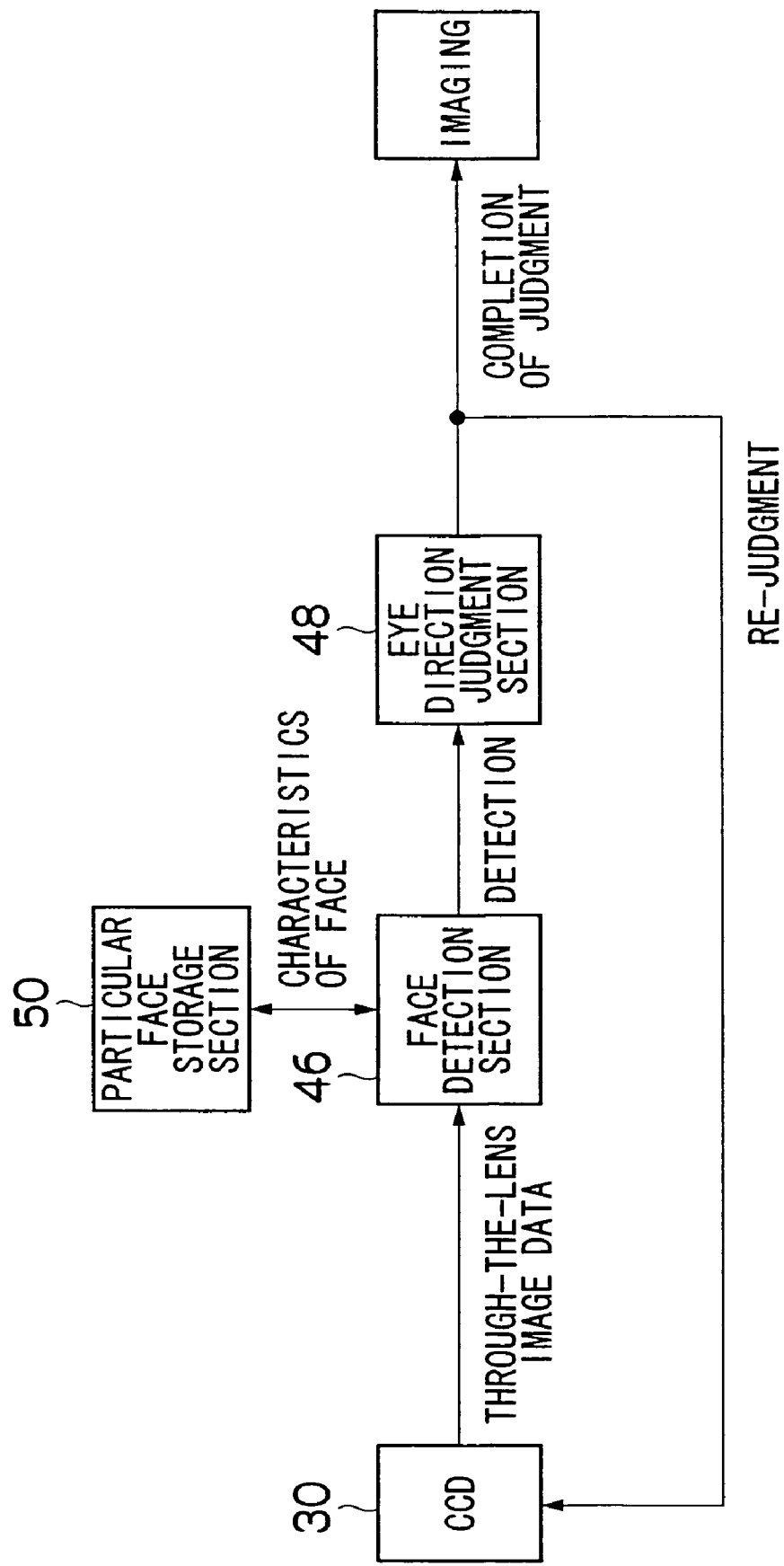

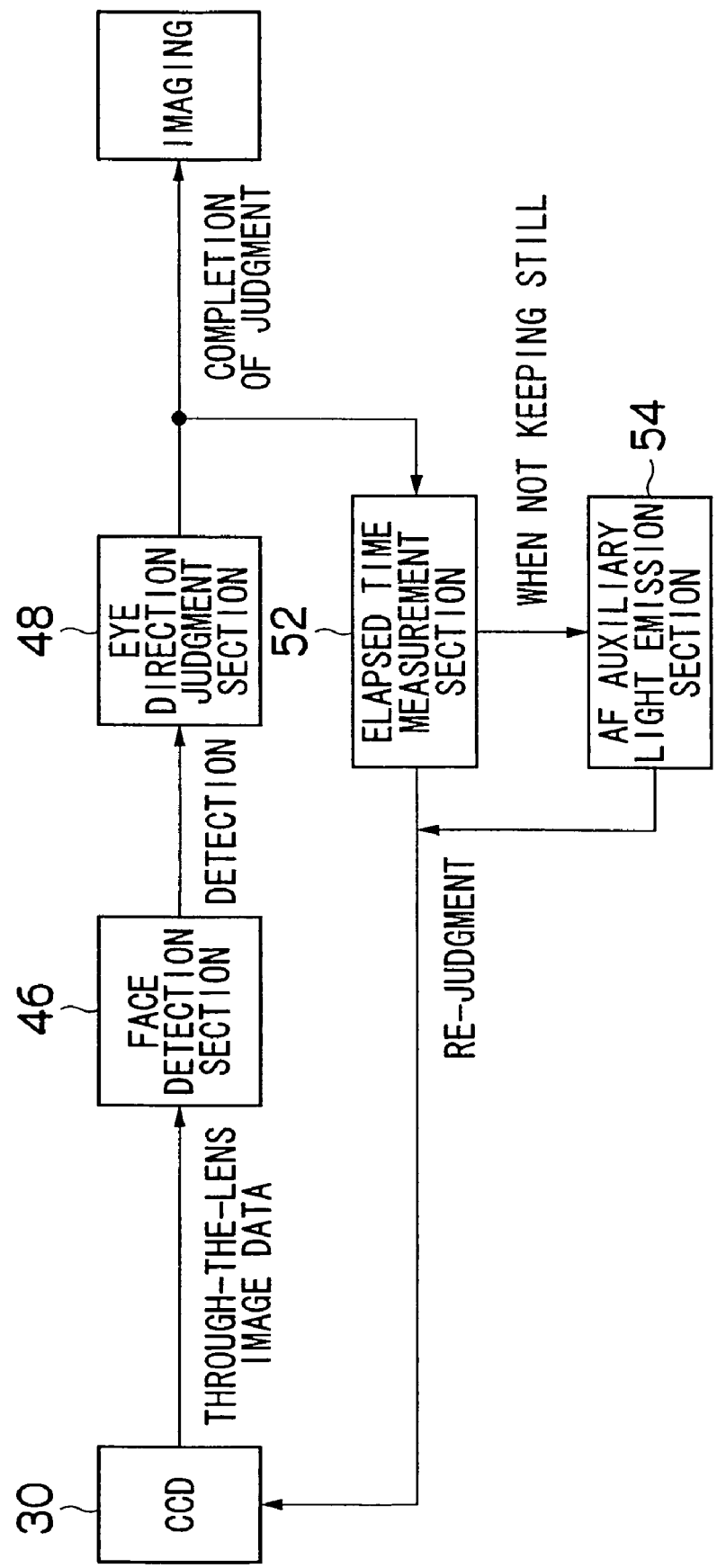

FIG.14C 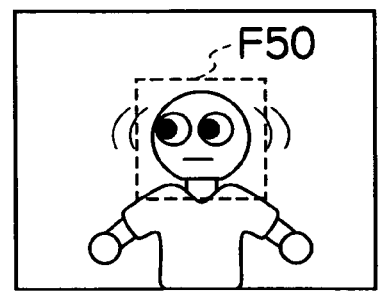 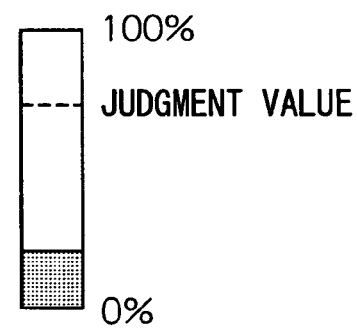
FIG.14D 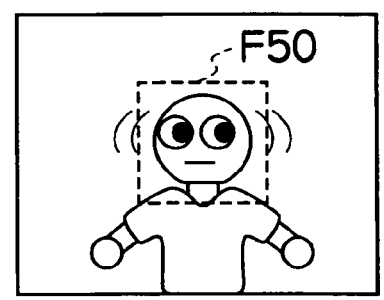 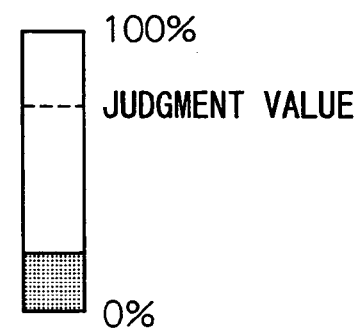
FIG.14E
EMISSION OF
AF AUXILIARY LIGHT 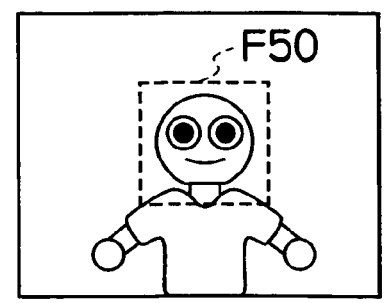 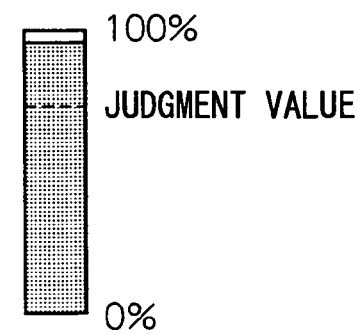

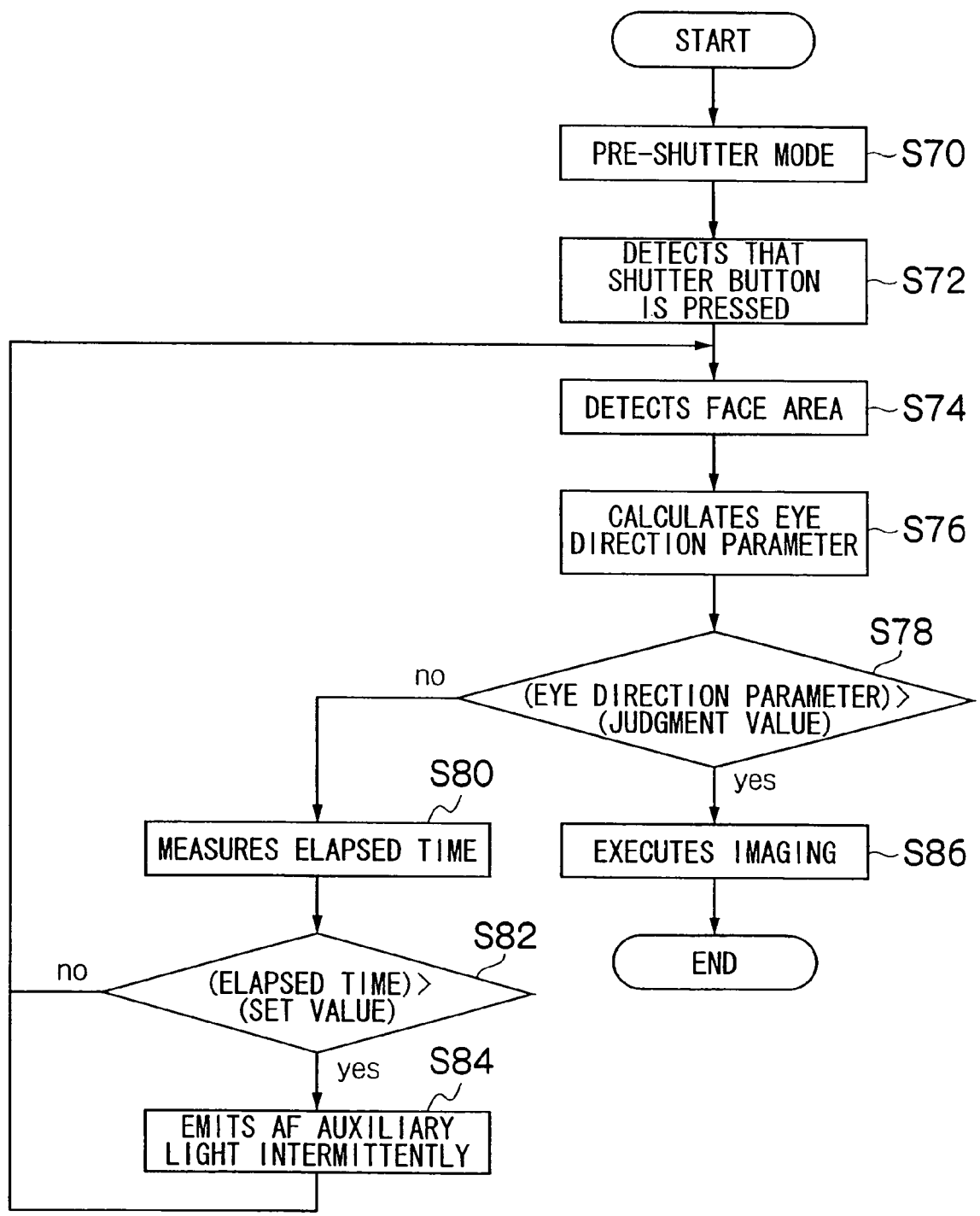

IMAGE TAKING APPARATUS AND IMAGE TAKING METHOD

BACKGROUND OF THE INVENTION

1. Field of the Invention

The present invention relates to an image taking apparatus and an image taking method, and more particularly, to an image taking apparatus and an image taking method for taking a picture of a person.

2. Description of the Related Art

Japanese Patent Application Laid-Open No. 2003-224761 discloses an image taking apparatus which automatically performs an image taking operation when detecting that the face of a subject turns in a predetermined direction.

In the case of taking a picture of an infant, the infant usually moves because he is not conscious that he must keep still. Therefore, it is difficult to catch the best moment to take a good picture in the case of taking a picture of an infant in comparison with taking a picture of an adult. Furthermore, there may be a case where, even though a picture is taken with the face of a subject directed to the image taking apparatus, the eyes are not directed to the image taking apparatus. In Japanese Patent Application Laid-Open No. 2003-224761, the eye direction of a subject person is not taken into account.

SUMMARY OF THE INVENTION

The present invention has been made in view of the above situation, and its object is to provide an image taking apparatus and an image taking method which makes it possible to certainly take a picture with the eyes of a subject toward the image taking apparatus.

In order to solve the above problems, the image taking apparatus according to a first aspect of the present invention comprises: an imaging device which takes an image of a subject; an imaging instruction device for inputting an imaging instruction to take the image of the subject; a face detection device which detects a face image of the subject from a live view image taken by the imaging device in response to the imaging instruction from the imaging instruction device; an eye direction judgment device which detects an eye direction of the subject from the face image and judges whether the eye direction of the subject is directed to the imaging device; and an imaging control device which, when it is judged that the eye direction of the subject is directed to the imaging device, immediately causes the imaging device to take an image of the subject.

According to the first aspect of the present invention, since imaging is immediately executed when a subject person's eyes turn to the imaging device, it is possible to certainly catch the best moment to take a good picture even in the case of taking a picture of an infant.

A second aspect of the present invention is the image taking apparatus of the first aspect of the present invention, further comprises a particular face storage device which stores a face image of a particular subject; wherein the face detection device detects the face image of the particular subject from the live view image based on the stored face image; the eye direction judgment device detects the eye direction of the particular subject from the face image of the particular subject and judges whether the eye direction of the particular subject is directed to the imaging device; and when it is judged that the eye direction of the particular subject is directed to the imaging device, the imaging control device immediately causes the imaging device to execute imaging.

According to the second aspect of the present invention, since imaging is immediately executed when the eyes of a particular person stored in advance are directed to the imaging device, it is possible to, for example, when multiple face areas are detected from a live view image, certainly catch the best moment to take a good picture in accordance with the eye direction of a particular face.

A third aspect of the present invention is the image taking apparatus of the first or second aspect of the present invention, further comprises: an elapsed time measurement device which measures time elapsed after the imaging instruction is inputted; and an eye direction guiding device which, if imaging of the subject is not executed even when the elapsed time exceeds a predetermined set value, performs emission of light or output of voice toward the subject to guide the eye direction of the subject to the imaging device.

According to the third aspect of the present invention, since a subject's attention is guided to the imaging device when the eye direction of the subject is not directed to the imaging device, it is possible to, even in the case where the subject is an infant who is difficult to keep still, take a picture with his eye direction directed to the imaging device.

A fourth aspect of the present invention is the image taking apparatus of the third aspect of the present invention, characterized in that the eye direction guiding device emits AF auxiliary light toward the subject.

The image taking method according to a fifth aspect of the present invention comprises: an imaging instruction step of inputting an imaging instruction to an imaging device which takes an image of a subject; a face detection step of detecting a face image of the subject from a live view image taken by the imaging device in response to the imaging instruction; an eye direction judgment step of detecting an eye direction of the subject from the face image and judging whether the eye direction of the subject is directed to the imaging device; and an imaging control step of, when it is judged that the eye direction of the subject is directed to the imaging device, immediately causing the imaging device to take an image of the subject.

The image taking method according to a sixth aspect of the present invention comprises: a particular face storage step of storing a face image of a particular subject; an imaging instruction step of inputting an imaging instruction to an imaging device which takes an image of a subject; a face detection step of detecting a face image of the particular subject from a live view image taken by the imaging device based on the stored face image in response to the imaging instruction; an eye direction judgment step of detecting the eye direction of the particular subject from the face image of the particular subject and determining whether the eye direction of the particular subject is directed to the imaging device; and an imaging control step of, when it is judged that the eye direction of the particular subject is directed to the imaging device, immediately causing the imaging device to execute imaging.

The image taking method of a seventh aspect of the present invention is the image taking method of the fifth or sixth aspect of the present invention, further comprises: an elapsed time measurement step of measuring time elapsed after the imaging instruction is inputted; and an eye direction guiding step of, if imaging of the subject is not executed even when the elapsed time exceeds a predetermined set value, performing emission of light or output of voice toward the subject to guide the eye direction of the subject to the imaging device.

According to the present invention, since imaging is immediately executed when a subject person's eyes turn to the imaging device, it is possible to certainly catch the best moment to take a good picture even in the case of taking a picture of an infant.

BRIEF DESCRIPTION OF THE DRAWINGS

FIG. 1 is a block diagram showing the main configuration of an image taking apparatus according to a first embodiment of the present invention;

FIG. 2 is a block diagram for illustrating imaging processing in a pre-shutter mode;

FIGS. 4A to 4D are diagrams showing an example of display on an image display section 40 in the pre-shutter mode;

FIG. 7 is a block diagram for illustrating imaging processing in a pre-shutter mode;

FIG. 13 is a block diagram for illustrating imaging processing in a pre-shutter mode;

FIGS. 14A to 14E are diagrams showing an example of display on an image display section 40 in the pre-shutter mode; and FIG. 15 is a flowchart showing the flow of the imaging processing in the pre-shutter mode.

DETAILED DESCRIPTION OF THE PREFERRED EMBODIMENTS

Figure 3A:
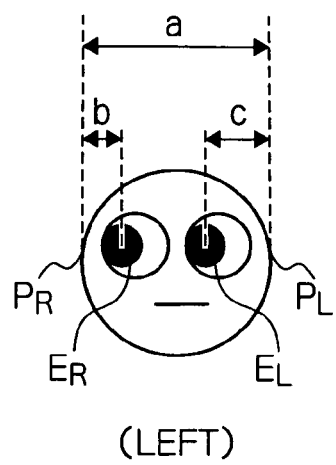
FIGS. 3A to 3C are diagrams for illustrating an eye direction parameter calculation method.

Preferred embodiments of the image taking apparatus and the image taking method according to the present invention will be described below in accordance with accompanying drawings.

First Embodiment

FIG. 1 is a block diagram showing the main configuration of an image taking apparatus according to a first embodiment of the present invention. As shown in FIG. 1, a CPU 12 is connected to each section in an image taking apparatus 10 (hereinafter referred to as a camera 10) via a bus 14. The CPU 12 is an overall control section which controls the operation of the camera 10 on the basis of an operation input from an operation section 16 and the like. The CPU 12 controls each section of the camera 10 on the basis of an input signal from the operation section 16, and, for example, it performs driving control of a lens unit 28, imaging operation control, image processing control, recording/reproduction control of image data, display control of an image display section 40, and the like.

The operation section 16 includes a power switch, an operation mode switch, a shooting mode switch, a face detection function on/off switch, a release button, a menu/OK key, a cross key and a cancel key.

The power switch is an operation device for controlling on/off of the power supply to the camera 10.

The operation mode switch is an operation device for switching the operation mode of the camera 10 between a shooting mode and a reproduction mode.

The shooting mode switch functions as a switch for switching the shooting mode of the camera 10. In addition a pre-shutter mode to be described later, the shooting mode of the camera 10 can be switched to a scene position mode for taking a picture by optimizing the focus and the exposure according to a scene position (for example, natural photo, person, scenery, sports, night view, underwater, close-up (flower and the like) or text sentence), an auto mode for automatically setting the focus and the exposure, a manual mode in which the focus and the exposure can be manually set, or a video shooting mode.

The face detection function on/off switch controls on/off of a face detection function of detecting a face from a taken image.

The release button is an operation button for inputting an instruction to start imaging, and it is configured by a two-stage-stroke-type switch having an S1 switch which is turned on by half-pressing and an S2 switch which is turned on by full-pressing.

The menu/OK key is an operation key having both of a function as a menu button for giving a direction to display a menu on the screen of the image display section 40 and a function as an OK button for giving a direction to decide and execute selected contents.

The cross key is an operation section for inputting an instruction specifying any of four directions of upward, downward, left and right directions, and it functions as a button for selecting an item from a menu screen or instructing selection of various setting items from each menu (a cursor moving operation device). The upper and lower keys of the cross key function as a zoom switch in the shooting mode or a reproduction zoom switch used during reproduction, and the right and left keys function as a frame advancing/returning button in the reproduction mode.

The cancel key is used to erase a desired target such as a selected item, cancel the contents of an instruction, or return the operation state to the immediately previous state.

In a ROM 18, programs to be processed by the CPU 12, various data required for control, and the like are stored. A RAM 20 includes a work area where CPU 12 performs various operation processings and the like and an image processing area.

The camera 10 has a medium socket (a medium attaching section) so that a recording medium 22 can be attached. The form of the recording medium 22 is not especially limited, and various media can be used such as xD Picture Card (registered trademark), a semiconductor memory card represented by SmartMedia (registered trademark), a portable small-sized hard disk, a magnetic disk, an optical disk and an magneto-optical disk. A media control section 24 performs necessary signal conversion to transfer an input/output signal suitable for the recording medium 22.

Furthermore, the camera 10 is provided with a communication interface section (communication I/F) 26 as a communication device for connecting to a public line network such as the Internet and a mobile phone communication network.

[Shooting Mode]

Next, the imaging function of the camera 10 will be described. In the shooting mode, an imaging section including a color CCD image sensor 30 (hereinafter referred to as a CCD 30) is powered on, and image taking is enabled.

A lens unit 28 is an optical unit which includes image taking lenses including a focus lens and a zoom lens, and a diaphragm. A lens driving section 28A is provided with a motor for moving the focus lens, the zoom lens and the diaphragm, a sensor for detecting the positions of the lenses, and the like. The CPU 12 outputs a control signal to the lens driving section 28A to perform control of focusing and zooming of the image taking lenses and control of the diaphragm.

From light which has passed through the lens unit 28, an image is formed on the receiving surface of the CCD 30. On the receiving surface of the CCD 30, a lot of photodiodes (light receiving elements) are two-dimensionally arrayed, and, for the respective photodiodes, primary color filters of red (R), green (G) and blue (B) are arranged in a predetermined array structure. The subject image formed on the receiving surface of the CCD 30 is converted to a signal charge with an amount corresponding to the amount of incident light by each photodiode. The signal charges are sequentially read as R, G and B voltage signals (image signals) corresponding to the amount of charge. The CCD 30 has an electronic shutter function of controlling the charge accumulation time (shutter speed) of each photodiode. The CPU 12 controls the timing of reading the signal charge from the CCD 30 and the charge accumulation time of the photodiodes of the CCD 30, via an imaging control section 30A.

The R, G and B image signals read from the CCD 30 undergo sampling hold (correlated double sampling processing) for each pixel of the CCD 30, by an analog processing section (CDS/AMP) 32 and are amplified. Then, they are added to an A/D converter 34 to be converted to digital signals. The R, G and B signals converted to the digital signals by the A/D converter 34 are stored in the RAM 20 via an image input control section 36.

An image signal processing section 38 functions as an image processing device including a synchronization circuit (a processing circuit for performing interpolation to correct the spatial displacement of color signals accompanying the color filter array of a single-plate CCD to convert the color signals to be synchronized), a white balance adjustment circuit, a gamma correction circuit, an outline correction circuit, a luminance/color difference signal generation circuit and the like, and it performs predetermined signal processing utilizing the RAM 20 in accordance with a direction from the CPU 12. That is, the image signal processing section 38 converts the digital R, G and B signals stored in the RAM 20 to luminance signals (Y signals) and color difference signals (Cr and Cb signals), performs predetermined processings such as gamma correction, and writes them back to the RAM 20.

In the case of monitor-outputting a taken image to the image display section 40 (for example, a liquid crystal monitor), the luminance/color difference signals (Y/C signals) stored in the RAM 20 are read and sent to a display control section 42 via the bus 14. The display control section 42 converts the inputted Y/C signals to video signals in a predetermined method for display (for example, color composite image signals in the NTSC method) and outputs it to the image display section 40.

When a live view image (through-the-lens image) is displayed, image data in the RAM 20 is periodically rewritten by an image signal outputted from the CCD 30, and an image signal generated from the image data is supplied to the image display section 40. Thereby, the picture being taken (through-the-lens image) is displayed on the image display section 40 in real time. A photographer can check the image taking angle of view by the through-the-lens image displayed on the image display section 40.

When the release button is half-pressed (S1 is on), the image signal outputted from the CCD 30 is inputted to the CPU 12 via the image input control section 36 after being A/D-converted, and then, AE and AF processings are started.

The CPU 12 divides one screen into multiple divided areas (for example, 8×8 or 16×16), and integrates the R, G and B image signals for each divided area. Then, the CPU 12 detects the luminance of the subject (subject brightness) on the basis of the integrated value to calculate an amount of exposure suitable for imaging (an imaging EV value), determines an aperture value and a shutter speed on the basis of the amount of exposure and a predetermined program chart, and controls the electronic shutter of the CCD 30 and the diaphragm to obtain an appropriate amount of exposure.

When automatic white balance adjustment is performed, the CPU 12 calculates, for each divided area, an average integrated value for each color of the R, G and B image signals to determine the ratios of R/G and B/G for each divided area, and judges the light source type on the basis of distribution of the R/G and B/G values in the color space of R/G and B/G axes coordinates. Then, the CPU 12 controls the gain values (white balance gains) for the R, G and B image signals on the basis of the judged light source type to perform correction of the image signal of each of the R, G and B color channels.

As the AF control of the camera 10, contrast AF, for example, is applied in which the focus lens is moved so that the high-frequency component of the G image signal is local maximum. That is, the CPU 12 cuts a signal in an AF area which is preset at a part of the effective pixel area (for example, the central part of the effective pixel area) of the CCD 30, causes only the high-frequency component of the G signal within the AF area to pass by a high-pass filter, and integrates the absolute value data of the high-frequency component to calculate a focus evaluation value (AF evaluation value) of the subject image within the AF area.

While controlling the lens driving section 28A to move the focus lens, the CPU 12 calculates the focus evaluation value at multiple AF detection points and determines the lens position where the focus evaluation value is local maximum as a focus position. Then, the CPU 12 controls the lens driving section 28A to move the focus lens to the determined focus position. The calculation of the focus evaluation value is not limited to the aspect using the G signal. The luminance signal (Y signal) may be used.

When the release button is full-pressed (S2 is on) after the release button is half-pressed (S1 is on) and the AE/AF processing is performed, an imaging operation for recording is started. Image data acquired in response to the S2 being turned on is converted to a luminance/color difference signal (Y/C signal) by the image signal processing section 38, undergoes predetermined processings such as gamma correction, and then stored in the RAM 20.

The Y/C signal stored in the RAM 20 is compressed by a compression/expansion processing section 44 in accordance with a predetermined format, and then recorded in the recording medium 22 via the media control section 24. For example, a still image is recorded as an image file in JPEG (Joint Photographic Experts Group) format, and a video is recorded as an image file in AVI (Audio Video Interleaving) format, that is, a Motion-JPEG image file.

[Reproduction Mode]

In the reproduction mode, compression data of the last image file (an image file recorded last) which is recorded in the recording medium 22 is read. When the image file recorded last is a still image, the read compressed data is expanded to a non-compressed YC signal by the compression/expansion processing section 44, converted to a signal for display, by the image signal processing section 38 and the display control section 42, and then outputted to the image display section 40. Thus, the image contents of the image file is displayed on the image display section 40.

By operating the right or left button of the cross button while one still-image frame is being reproduced (including the case where the top frame of a video is being reproduced), switching of the image file to be reproduced (frame advancing/frame returning) can be performed. The image file at the position determined by the frame advancing/returning is read from the recording medium 22, and a still image or a video is reproduced and displayed on the image display section 40 similarly to the above case.

[Pre-Shutter Mode]

Next, the pre-shutter mode will be described. FIG. 2 is a block diagram for illustrating the imaging processing in the pre-shutter mode.

When the shooting mode is set to the pre-shutter mode, a face detection section 46 performs face detection processing of through-the-lens image data outputted from the CCD 30, and detects a face area including the image of the face of a subject from the through-the-lens image data. As a method for the face area detection processing, there is a method in which pixels with a color close to the color specified as flesh color are taken out from the original image and the area taken-out is detected as the face area. For example, the above processing is performed by specifying, in the color space for differentiating flesh color from other colors, the range of the flesh color in the color space on the basis of flesh color information obtained in advance by sampling and judging whether or not the color of each pixel is included within the specified range. Methods for the face area detection processing other than the above method may be used.

An eye direction judgment section 48 detects the image of the subject's eyes from the face area and judges whether the eye direction of the subject person is directed to the camera 10. The face area detection processing and the eye direction judgment processing described above are repeated at predetermined time intervals when the mode is the pre-shutter mode. Then, when determining that the eye direction of the subject person is directed to the camera 10, the eye direction judgment section 48 sends a signal indicating that to the CPU 12. When receiving the signal indicating that the eye direction is directed to the camera 10, from the eye direction judgment section 48, the CPU 12 controls each section of the camera 10 to immediately execute the imaging processing.

Next, the eye direction judgment processing will be specifically described. The eye direction judgment section 48 detects the image of the subject's eyes from the face area detected by the face detection section 46 and detects the central positions of the black parts of the eyes in the image of the eyes. Then, the eye direction judgment section 48 calculates an eye direction parameter indicating the degree of how much the eye direction of the subject person is directed to the camera 10, on the basis of the central positions of the black parts of the eyes, and judges whether the eye direction of the subject person is directed to the camera 10 on the basis of the eye direction parameter. As a method for detecting the central position of the black parts of the eyes, there is, for example, a method of generating a grayscale image of the face area and detecting the central position of the black parts of the eyes from the grayscale image, or a method of generating an edge image by applying an edge extraction filter for detecting an edge (a border between a light part and a dark part generated in an image) to the grayscale image of the face area, and detecting the central position of the black parts of the eyes by performing matching between the edge image and templates of face parts (such as eyes) formed by an edge.

Figure 3B:
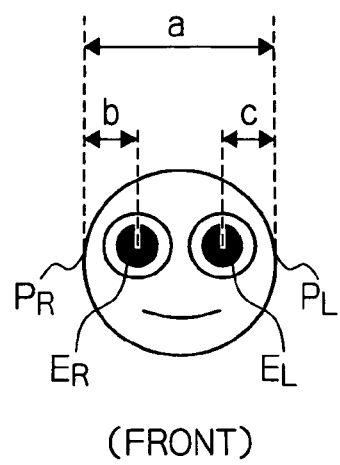
Figure 3C:
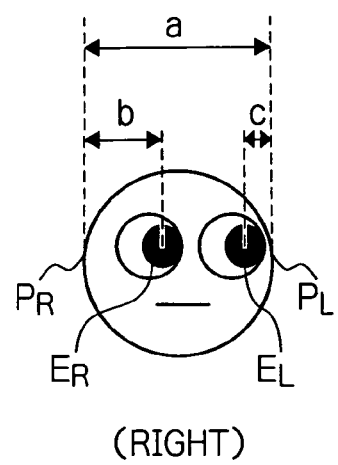

FIGS. 3A to 3C are diagrams for illustrating an eye direction parameter calculation method. In FIGS. 3A to 3C, the intersection points of the line passing the central positions of the black parts of the right and left eyes (points $E_R$ and $E_L$, respectively) with the right and left end parts of the face area (flesh-color area) are denoted by points $P_R$ and $P_L$, respectively. When the width of the face area of the subject (the distance between the points $P_R$ and $P_L$) is denoted by a, the distance between the central position of the black part of the right eye $E_R$ and the right end part of the face area $P_R$ is denoted by b, and the distance between the central position of the black part of the left eye $E_L$ and the left end part of the face area $P_L$ is denoted by c, the eye direction parameter α[%] is indicated by the following formula (1):

$$\alpha = \left(1 - \left|\frac{b}{a} - \frac{c}{a}\right|\right) \times 100\ [\%] \tag{1}$$

As shown in FIG. 3B, when the eye direction of a subject is directed to the camera 10, the eye direction parameter α shows a value close to 100%. On the other hand, as shown in FIGS. 3A and 3C, when the eye direction of the subject is not directed to the camera 10, the eye direction parameter α shows a low value.

Figure 4A:
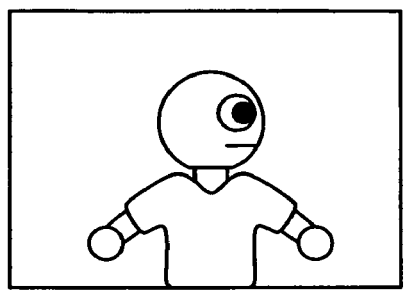
Figure 4B:
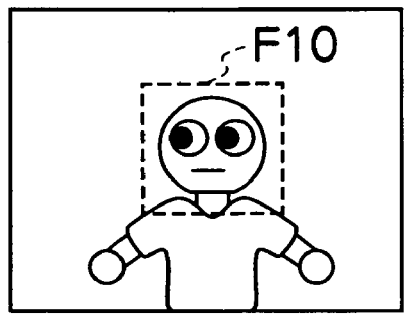

FIGS. 4A to 4D are diagrams showing an example of display on the image display section 40 in the pre-shutter mode. In FIGS. 4A to 4D, reference numeral F10 denotes a face detection frame which is attached to a detected face area. When the shutter button is pressed (S2 is on) in the pre-shutter mode, detection of a face area, calculation of the eye direction parameter α and judgment of the eye direction are repeated as shown in FIGS. 4A to 4C. Then, as shown in FIG. 4D, when the eye direction parameter α exceeds a predetermined judgment value, it is judged by the eye direction judgment section 48 that the eye direction of the subject person is directed to the camera 10, and the imaging processing is immediately executed.

Figure 5:
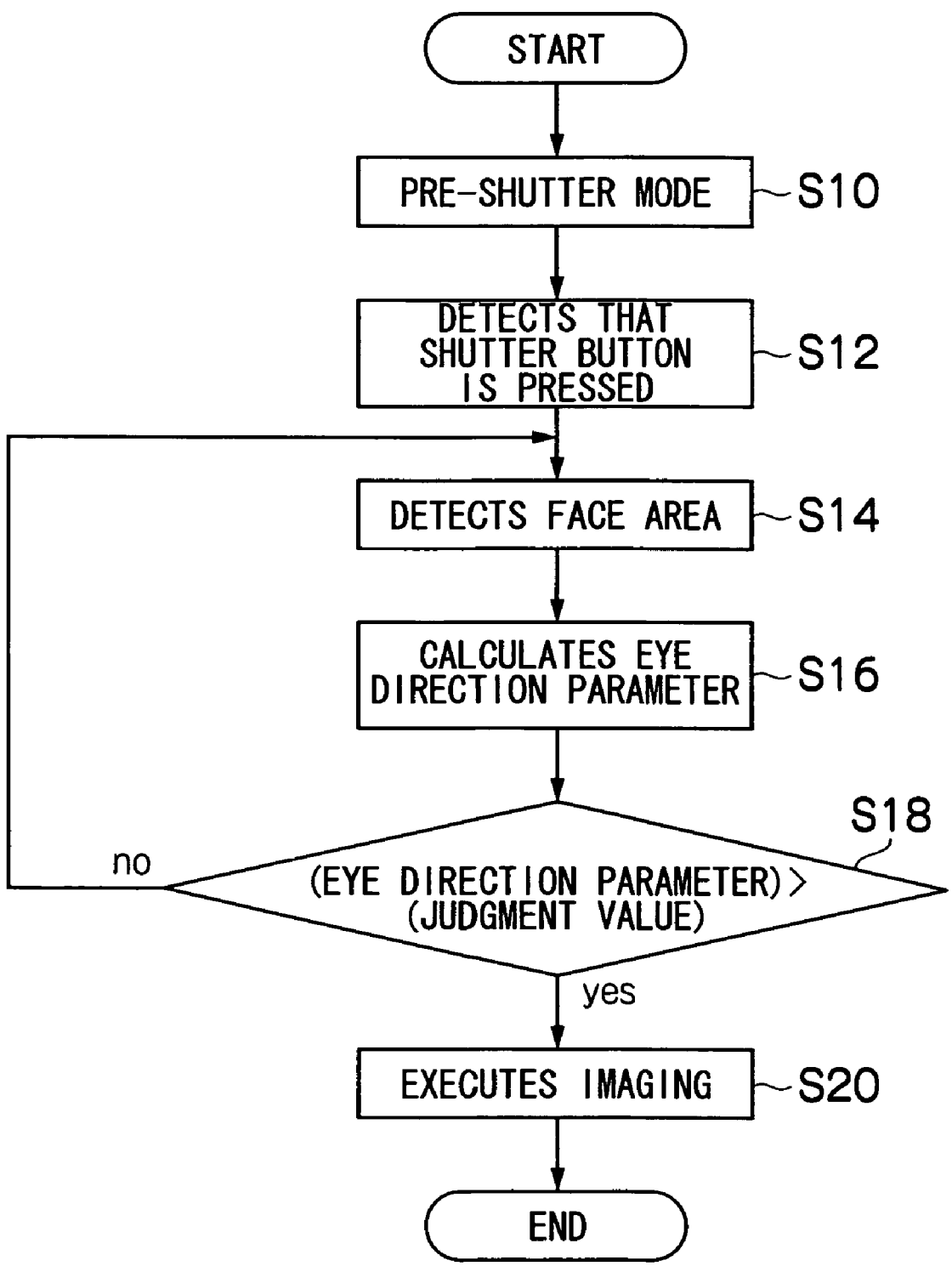
FIG. 5 is a flowchart showing the flow of the imaging processing in the pre-shutter mode.

Next, the imaging processing in the pre-shutter mode will be described with reference to the flowchart in FIG. 5. First, when the shooting mode is set to the pre-shutter mode (step S10), and it is detected that the shutter button is pressed (S2 is on) (step S12), the face area detection processing is executed for through-the-lens image data outputted from the CCD 30 (step S14), and the eye direction parameter α calculation processing is executed on the basis of the image of a detected face area (step S16). If the eye direction parameter a is below the judgment value (step S18: No), then the processes of steps S14 and S16 are repeated at predetermined time intervals. When the eye direction parameter a becomes larger than the judgment value (step S18: Yes), imaging of the subject is immediately executed, and a taken image is recorded in the recording medium 22 as an image file (step S20).

According to this embodiment, since imaging is immediately executed when a subject person's eyes turn to the camera 10, it is possible to certainly catch the best moment to take a good picture even in the case of taking a picture of an infant.

If multiple face areas are detected at the above step S14, the eye direction judgment is performed for all the detected face areas, and imaging can be executed when the eye directions of all the face areas are directed to the camera 10. The eye direction judgment may be performed only for a face area with a predetermined or larger size, a face area close to the center of the image, a face area close to the camera 10, or a face area satisfying a combination of the above conditions, among the detected face areas. Furthermore, the face area to be targeted by the eye direction judgment may be manually selected.

Second Embodiment

Figure 6:
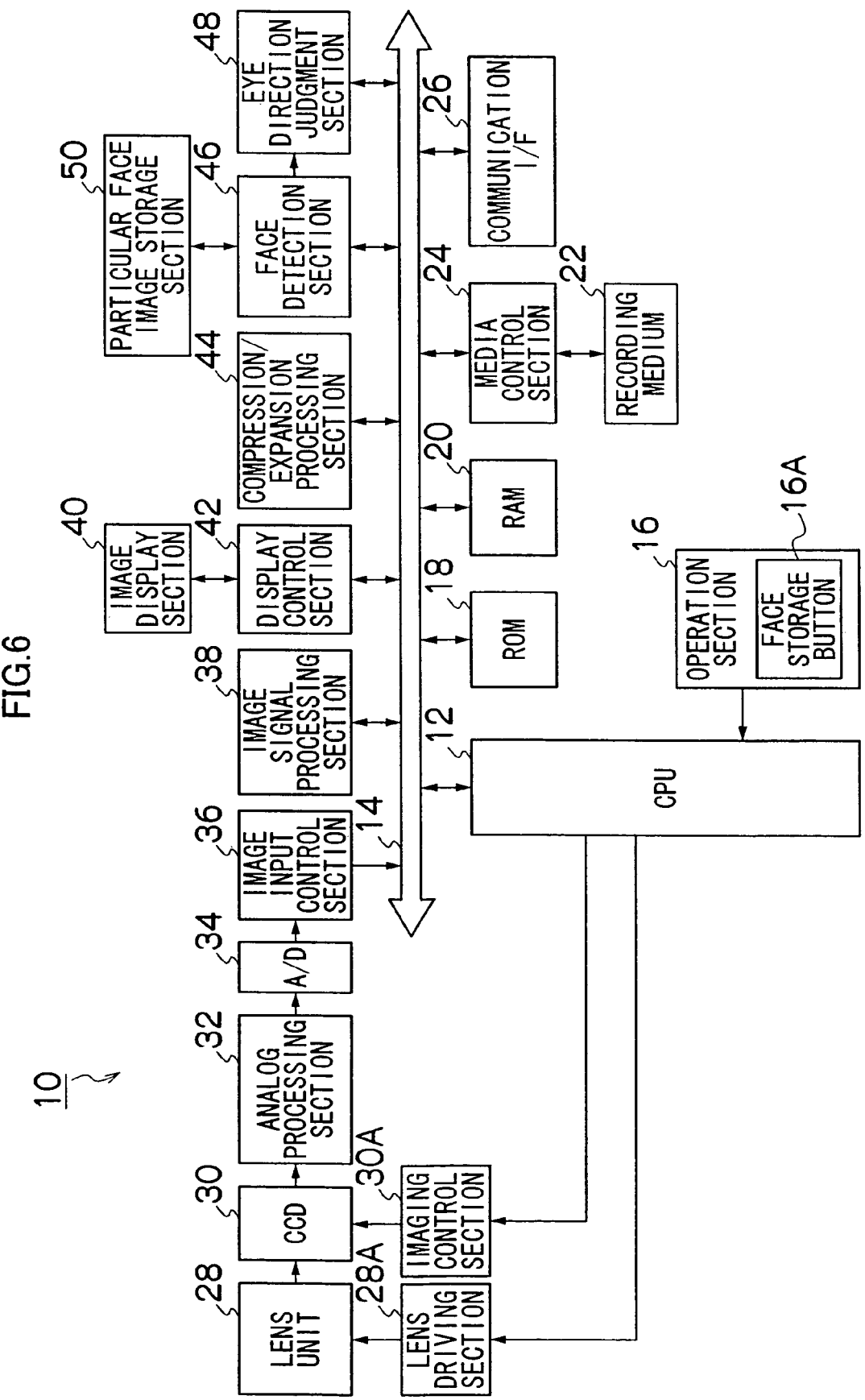
FIG. 6 is a block diagram showing the main configuration of an image taking apparatus according to a second embodiment of the present invention.

Next, a second embodiment of the present invention will be described. FIG. 6 is a block diagram showing the main configuration of an image taking apparatus according to the second embodiment of the present invention, and FIG. 7 is a block diagram for illustrating imaging processing in a pre-shutter mode. In the description below, components similar to those in FIG. 1 are given the same reference numerals, and description thereof will be omitted.

A particular face storage section 50 is a storage device for storing the image of a particular person's face (a particular face). Particular face storage processing is executed by pressing a face storage button 16A of an operation section 16 to take a picture of the face of a subject.

In the pre-shutter mode, a face detection section 46 detects a face area including the particular face from through-the-lens image data outputted from a CCD 30 and selects it as the target by eye direction judgment. As a method for detecting the face area including the particular face from the through-the-lens image data, there is a method in which the face area is detected by extracting the face characteristics and a reliability index (for example, a contrast index of the image) from the image of the particular face stored in the particular face storage section 50 to generate face metadata in advance, storing the face metadata of the particular face in the particular face storage section 50, and calculating the degree of similarity by pattern matching with face meta data generated from the face area in the through-the-lens image data (for example, Japanese Patent Application Laid-Open No. 2003-187229).

An eye direction judgment section 48 detects the image of the eyes of the face area targeted by the eye direction judgment, and judges whether the eye direction of the particular person is directed to a camera 10. The processing for detecting a face area targeted by the eye direction judgment and the eye direction judgment processing described above are repeated at predetermined time intervals when the mode is the pre-shutter mode. Then, when judging that the eye direction of the particular person is directed to the camera 10, the eye direction judgment section 48 sends a signal indicating that to a CPU 12. When receiving the signal indicating that the eye direction of the particular person is directed to the camera 10, from the eye direction judgment section 48, the CPU 12 controls each section of the camera 10 to immediately execute the imaging processing.

Figure 8A:
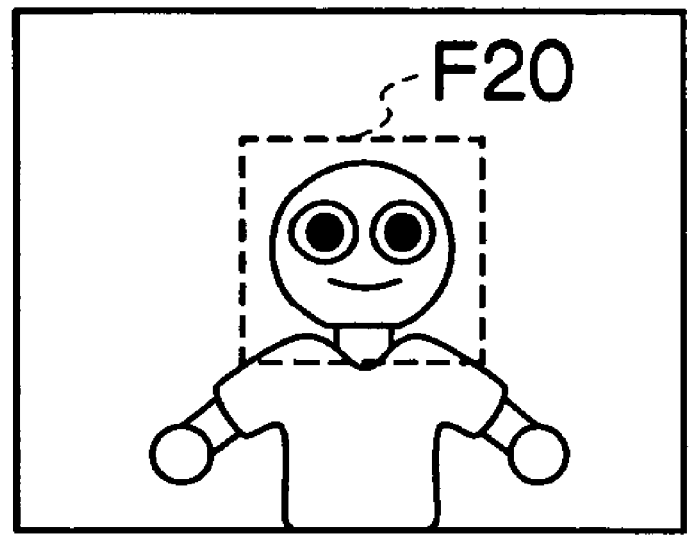
FIGS. 8A and 8B are diagrams showing processing for storing the face of a particular person in a particular face storage section 50.
Figure 8B:
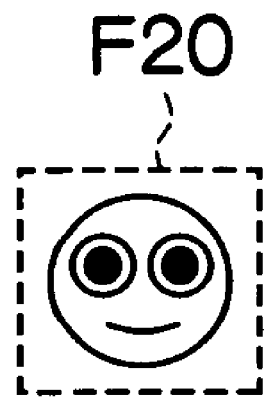
Figure 9:
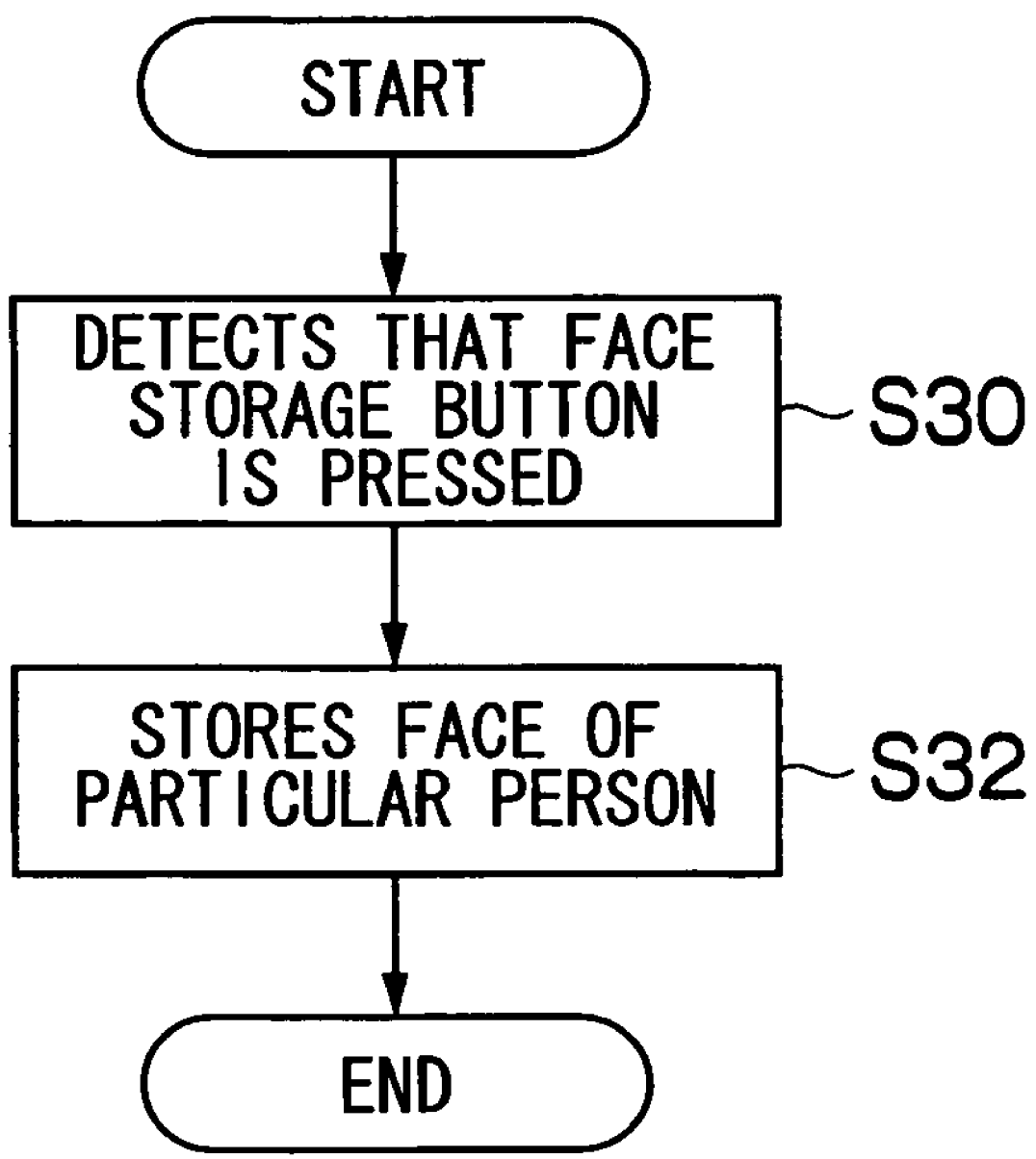
FIG. 9 is a flowchart showing the flow of the processing for storing the face of a particular person in the particular face storage section 50.

Next, the processing for storing a particular person's face in the particular face storage section 50 will be described with reference to FIGS. 8 and 9. First, when it is detected that the face storage button 16A of the operation section 16 is pressed (step S30), the image of a subject is taken, and the face detection processing is executed for the taken image by the face detection section 46. Then, as shown in FIG. 8A, when a face area F20 is detected from the taken image, the face characteristics of the face area F20 are acquired and stored in the particular face storage section 50 (step S32).

Figure 10A:
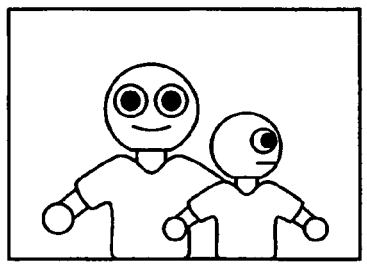
FIGS. 10A to 10E are diagrams showing an example of display on an image display section 40 in the pre-shutter mode.
Figure 10B:
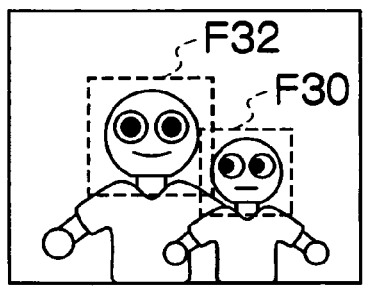
Figure 10C:
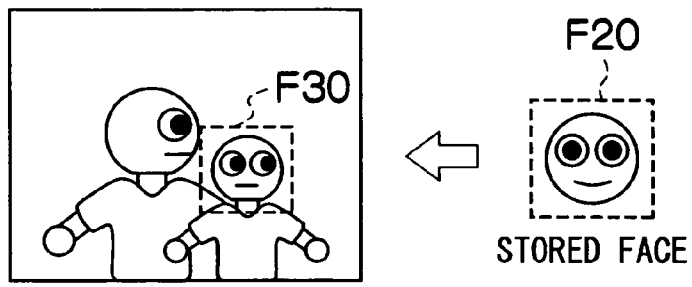
Figure 10D:
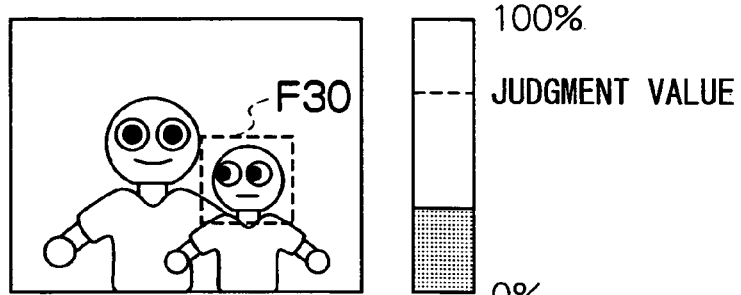
Figure 10E:
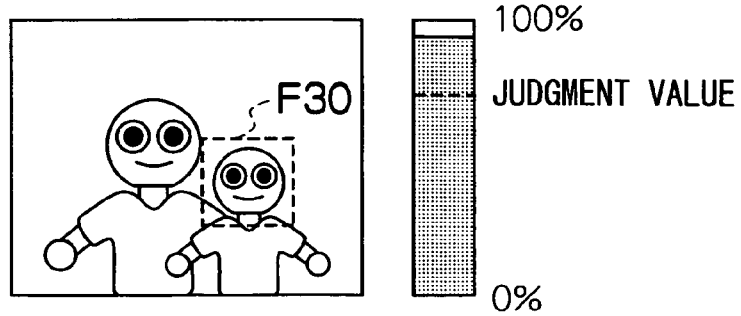

Next, the imaging processing in the pre-shutter mode will be described. FIGS. 10A to 10E are diagrams showing an example of display on an image display section 40 in the pre-shutter mode. When the shooting mode is set to the pre-shutter mode, through-the-lens image data is acquired and the face area detection processing is executed as shown in FIG. 10A. As shown in FIG. 10B, when multiple face areas are detected, the characteristics of detected face areas F30 and F32 are acquired and checked against the characteristics of a particular face stored in the particular face storage section 50. Then, between the face areas F30 and F32, the face area which is the most similar to the particular face (in FIG. 10C, the face area F30) is selected as the target by the eye direction judgment. Next, as shown in FIGS. 10D and 10E, the eye direction judgment processing is performed for the face area F30. When an eye direction parameter α is larger than a judgment value, the imaging processing is immediately executed.

Figure 11:
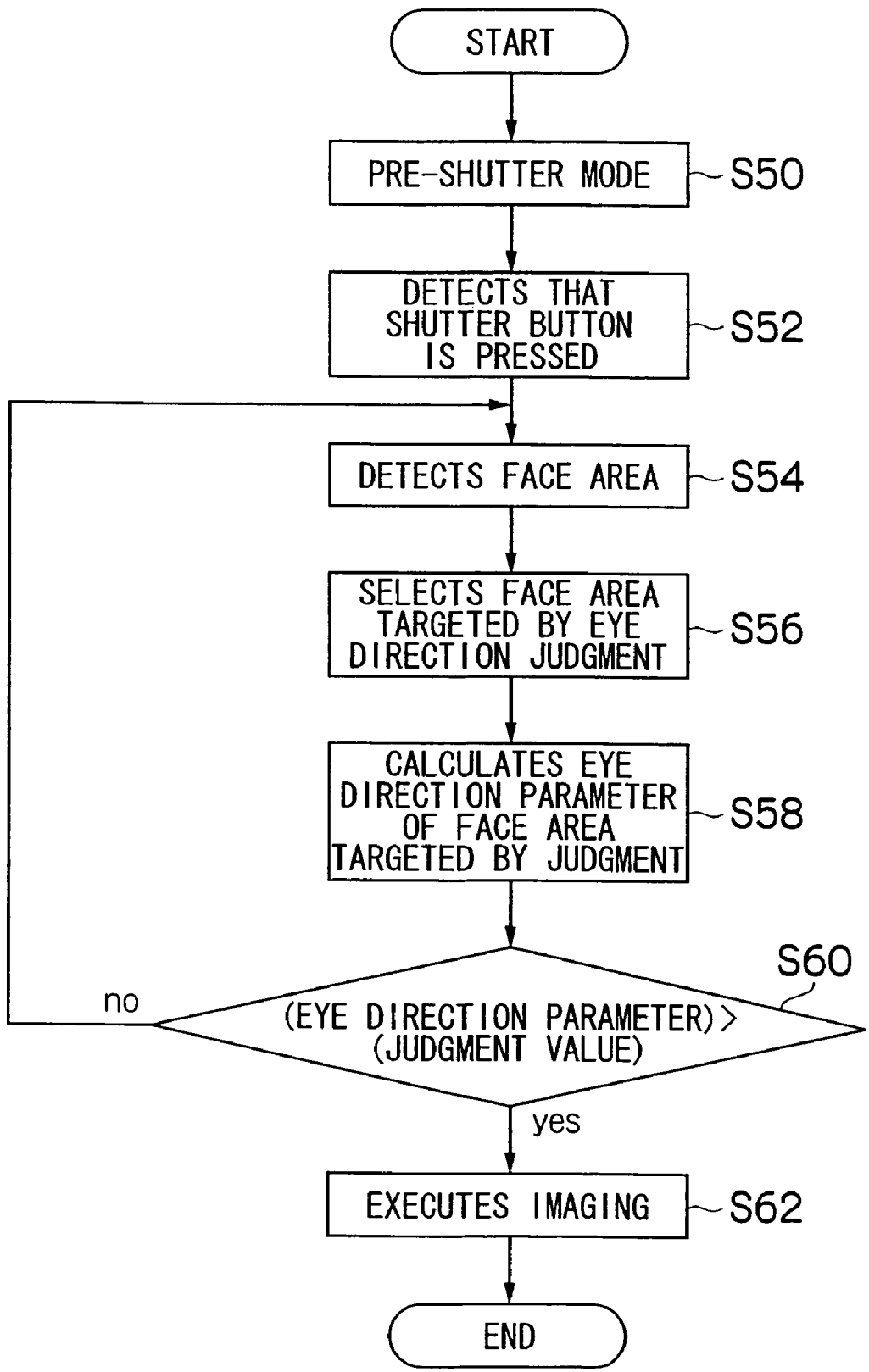
FIG. 11 is a flowchart showing the flow of imaging processing in the pre-shutter mode.

FIG. 11 is a flowchart showing the flow of the imaging processing in the pre-shutter mode. When the shooting mode is set to the pre-shutter mode (step S50), and it is detected that the shutter button is pressed (S2 is on) (step S52), the face area detection processing is executed for through-the-lens image data outputted from the CCD 30 (step S54).

Next, at step S54, the characteristics of the face areas detected from the through-the-lens image data are acquired and checked against the characteristics of a particular face stored in the particular face storage section 50. Then, the face area which is the most similar to the particular face, among the face areas detected from the through-the-lens image data, is selected as the target by the eye direction judgment (step S56).

Next, eye direction parameter a calculation processing is executed on the basis of the image of the face area targeted by the eye direction judgment (step S58). If the eye direction parameter a is below the judgment value (step S60: No), then the processes of steps S54 to S58 are repeated at predetermined time intervals. When the eye direction parameter α becomes larger than the judgment value (step S60: Yes), imaging of the subject is immediately executed, and a taken image is recorded in a recording medium 22 as an image file (step S62).

According to the present embodiment, since imaging is immediately executed when the eyes of a particular person stored in the camera 10 in advance is directed to the camera 10, it is possible to, for example, when multiple face areas are detected from through-the-lens image data, certainly catch the best moment to take a good picture in accordance with the eye direction of a particular face.

Third Embodiment

Figure 12:
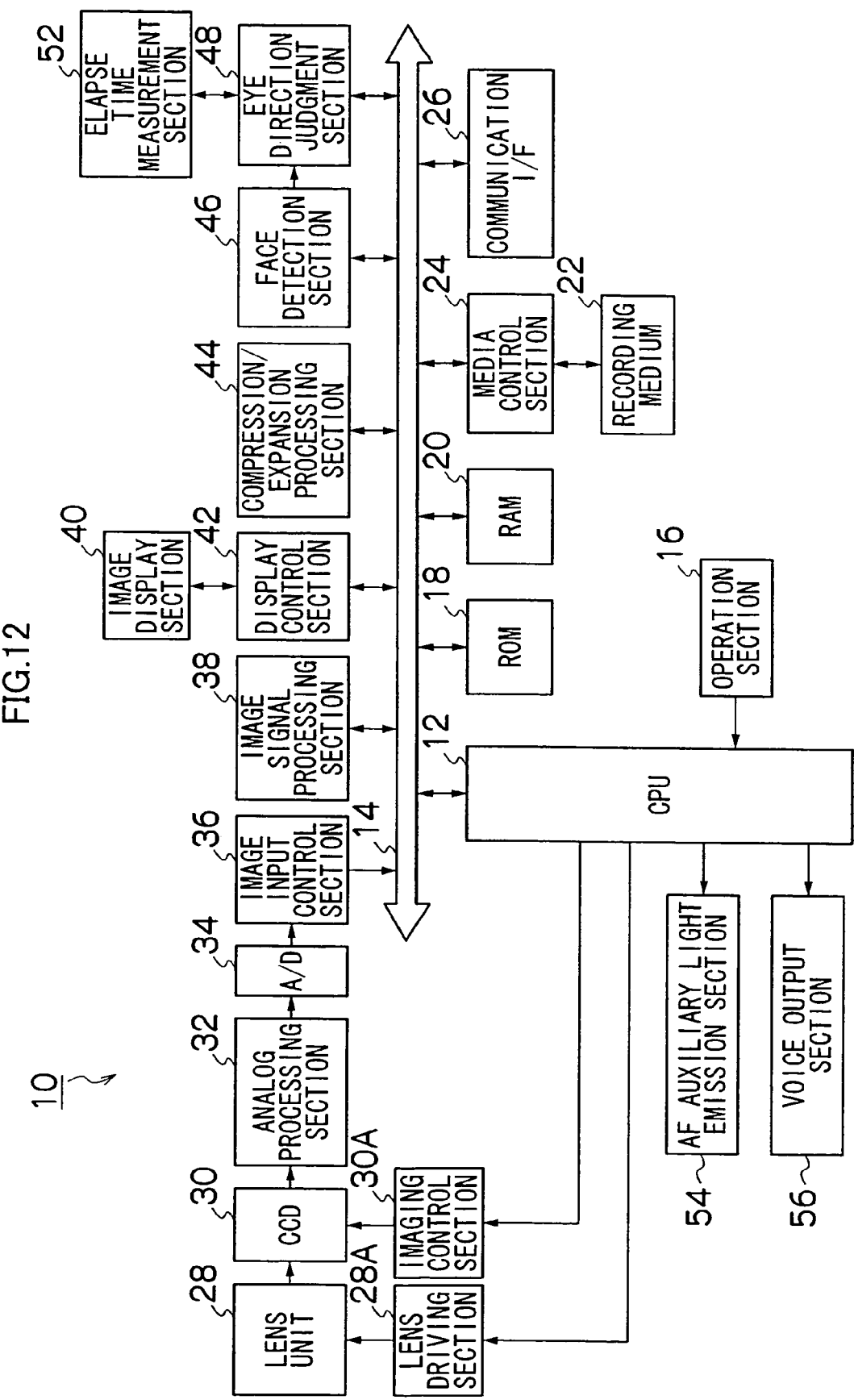
FIG. 12 is a block diagram showing the main configuration of an image taking apparatus according to a third embodiment of the present invention.

Next, a third embodiment of the present invention will be described. FIG. 12 is a block diagram showing the main configuration of an image taking apparatus according to the third embodiment of the present invention, and FIG. 13 is a block diagram for illustrating imaging processing in a pre-shutter mode. In the description below, components similar to those in FIG. 1 and the like are given the same reference numerals, and description thereof will be omitted.

An elapsed time measurement section 52 measures the time elapsed after a shutter button is pressed (S2 is on) in the pre-shutter mode, and sends a signal instructing emission of an AF auxiliary light to an AF auxiliary light emission section 54 if the measured value of the elapsed time exceeds a set value set in advance. The AF auxiliary light emission section 54 emits the AF auxiliary light in response to the signal from the elapsed time measurement section 52.

Figure 14A:
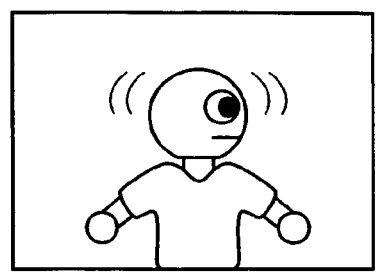
Figure 14B:
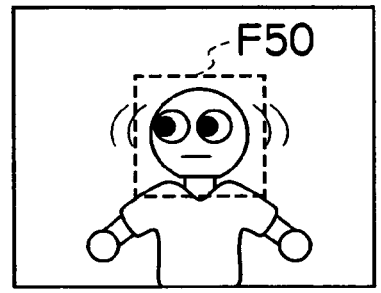

Next, the imaging processing in the pre-shutter mode will be described. FIGS. 14A to 14E are diagrams showing an example of display on an image display section 40 in the pre-shutter mode. When the shooting mode is set to the pre-shutter mode, and the shutter button is pressed (S2 is on), through-the-lens image data is acquired and face area detection processing is executed as shown in FIG. 14A. Next, as shown in FIGS. 14B to 14D, eye direction judgment processing is performed for a detected face area F50. Then, when the measured value of the time elapsed after the shutter button is pressed exceeds a set value, AF auxiliary light is emitted. When the subject is attracted to a camera 10, and an eye direction parameter α is larger than a judgment value, the imaging processing is immediately executed.

FIG. 15 is a flowchart showing the flow of the imaging processing in the pre-shutter mode. First, when the shooting mode is set to the pre-shutter mode (step S70), and it is detected that the shutter button is pressed (S2 is on) (step S72), the face area detection processing is executed for through-the-lens image data outputted from the CCD 30 (step S74), and the eye direction parameter a calculation processing is executed on the basis of the image of a detected face area (step S76). If the eye direction parameter a is below the judgment value (step S78: No), then the time elapsed after the shutter button is pressed is measured (step S80). If the time elapsed after the shutter button is pressed is below the set value (step S82: No), then the flow returns to step S74, and the face area detection processing and the eye direction parameter α calculation processing are executed again.

When the processes of steps S74 to S82 are repeated, and the time elapsed after the shutter button is pressed exceeds the set value (step S82: Yes), a signal instructing emission of an AF auxiliary light is sent from the elapsed time measurement section 52 to the AF auxiliary light emission section 54. Intermittent emission of the AF auxiliary light is performed (step S84), and the flow returns to step S74.

Then, the processes of steps S74 to S84 are repeated. When the eye direction parameter α becomes larger than the judgment value (step S78: Yes), imaging of the subject is immediately executed, and the taken image is recorded in a recording medium 22 as an image file (step S86).

According to this embodiment, since an AF auxiliary light is used to attract a subject's attention to the camera 10 when the eye direction of the subject is not directed to the camera 10, it is possible to, even in the case where the subject is an infant who is difficult to keep still, take a picture with his eye direction directed to the camera 10.

If multiple face areas are detected at the above step S74, the eye direction judgment is performed for all the detected face areas, and imaging can be executed when the eye directions of all the face areas are directed to the camera 10. The eye direction judgment may be performed only for a face area with a predetermined or larger size, a face area close to the center of the image, a face area close to the camera 10, or a face area satisfying a combination of the above conditions, among the detected face areas. Furthermore, the face area to be targeted by the eye direction judgment may be manually selected.

The AF auxiliary light is used to attract the attention of a subject in this embodiment. However, it is also possible, for example, to output a voice from a voice output section 56 to attract the attention of a subject or use both of the AF auxiliary light and the voice. A flash may be emitted to attract the attention of a subject in the case of a mode in which flash emission is not performed. The way of emitting the AF auxiliary light or the flash, the kind of the voice, or a combination thereof may be changed each time a picture is taken.

Though the eye direction parameter α is used to judge the eye direction in the embodiments described above, the eye direction judgment method is not limited thereto.

In each of the above embodiments, it is also possible to judge whether the face faces front on the basis of the position of both eyes in the face area or the positional relation between the face and the body, and perform the eye direction judgment when it is judged that the face faces front.

The image taking apparatus and the image taking method according to the present invention can be also realized by applying a program which performing the processings described above to a computer provided with an imaging device.

What is claimed is:

1. An image taking apparatus comprising:
   an imaging device which takes an image of a subject:
   an imaging instruction device for inputting an imaging instruction to take the image of the subject;
   a face detection device which detects a face image of the subject from a live view image taken by the imaging device in response to the imaging instruction from the imaging instruction device;
   an eye direction judgment device which detects an eye direction of the subject from the face image and judges whether the eye direction of the subject is directed to the imaging device; and
   an imaging control device which, when it is judged that the eye direction of the subject is directed to the imaging device, immediately causes the imaging device to take an image of the subject.

2. The image taking apparatus according to claim 1, further comprising a particular face storage device which stores a face image of a particular subject, wherein
   the face detection device detects the face image of the particular subject from the live view image based on the stored face image,
   the eye direction judgment device detects the eye direction of the particular subject from the face image of the particular subject and judges whether the eye direction of the particular subject is directed to the imaging device, and
   when it is judged that the eye direction of the particular subject is directed to the imaging device, the imaging control device immediately causes the imaging device to execute imaging.

3. The image taking apparatus according to claim 1, further comprising:
   an elapsed time measurement device which measures time elapsed after the imaging instruction is inputted; and
   an eye direction guiding device which, if imaging of the subject is not executed even when the elapsed time exceeds a predetermined set value, performs emission of light or output of voice toward the subject to guide the eye direction of the subject to the imaging device.

4. The image taking apparatus according to claim 2, further comprising:
   an elapsed time measurement device which measures time elapsed after the imaging instruction is inputted; and
   an eye direction guiding device which, if imaging of the subject is not executed even when the elapsed time exceeds a predetermined set value, performs emission of light or output of voice toward the subject to guide the eye direction of the subject to the imaging device.

5. The image taking apparatus according to claim 3, wherein the eye direction guiding device emits AF auxiliary light toward the subject.

6. The image taking apparatus according to claim 4, wherein the eye direction guiding device emits AF auxiliary light toward the subject.

7. An image taking method comprising:
an imaging instruction step of inputting an imaging instruction to an imaging device which takes an image of a subject;
a face detection step of detecting a face image of the subject from a live view image taken by the imaging device in response to the imaging instruction;
an eye direction judgment step of detecting an eye direction of the subject from the face image and judging whether the eye direction of the subject is directed to the imaging device; and
an imaging control step of, when it is judged that the eye direction of the subject is directed to the imaging device, immediately causing the imaging device to take an image of the subject.

8. The image taking method according to claim 7, further comprising:
an elapsed time measurement step of measuring time elapsed after the imaging instruction is inputted; and
an eye direction guiding step of, if imaging of the subject is not executed even when the elapsed time exceeds a predetermined set value, performing emission of light or output of voice toward the subject to guide the eye direction of the subject to the imaging device.

9. An image taking method comprising:
a particular face storage step of storing a face image of a particular subject;
an imaging instruction step of inputting an imaging instruction to an imaging device which takes an image of a subject;
a face detection step of detecting a face image of the particular subject from a live view image taken by the imaging device based on the stored face image in response to the imaging instruction;
an eye direction judgment step of detecting the eye direction of the particular subject from the face image of the particular subject and determining whether the eye direction of the particular subject is directed to the imaging device; and
an imaging control step of, when it is judged that the eye direction of the particular subject is directed to the imaging device, immediately causing the imaging device to execute imaging.

10. The image taking method according to claim 9, further comprising:
an elapsed time measurement step of measuring time elapsed after the imaging instruction is inputted; and
an eye direction guiding step of, if imaging of the subject is not executed even when the elapsed time exceeds a predetermined set value, performing emission of light or output of voice toward the subject to guide the eye direction of the subject to the imaging device.

* * * * *